United States Patent [19]

Eller

[11] Patent Number: 4,984,683
[45] Date of Patent: Jan. 15, 1991

[54] FINE JEWELRY ENCLOSING WEARER IDENTIFICATION AND MEDICAL INFORMATION THEREIN

[76] Inventor: Audrey L. Eller, 221 Loma Corta Dr., Solana Beach, Calif. 92075

[21] Appl. No.: 494,439

[22] Filed: Mar. 16, 1990

[51] Int. Cl.⁵ .................. B65D 85/67; A44C 15/00
[52] U.S. Cl. .......................... 206/38; 40/638; 40/642; 63/1.1; 63/19; 206/39.7
[58] Field of Search .................. 24/304; 40/633, 638, 40/642; 63/1.1, 3, 12, 18, 19, 21, 23; 206/37, 38, 39, 39.3, 39.7, 449

[56] References Cited

U.S. PATENT DOCUMENTS

| | | | |
|---|---|---|---|
| 919,983 | 4/1909 | Walsh | 40/642 |
| 1,910,476 | 5/1933 | Rulong | 40/642 |
| 2,863,307 | 12/1958 | Donle | 63/19 |
| 3,079,771 | 3/1963 | Donle | 63/19 |
| 3,372,500 | 3/1968 | Claude | 63/3 |
| 3,402,808 | 9/1968 | Yannuzzi | 206/37 |
| 3,624,939 | 12/1971 | Gossard | 63/19 |
| 3,660,916 | 5/1972 | McDermott et al. | 40/633 |
| 3,999,317 | 12/1976 | Owens | 40/642 |
| 4,197,665 | 4/1980 | Siiter | 63/18 |
| 4,215,497 | 8/1980 | Levy | 40/642 |

FOREIGN PATENT DOCUMENTS

| | | | |
|---|---|---|---|
| 359154 | 3/1906 | France | 40/642 |
| 2467 | of 1910 | United Kingdom | 40/642 |

Primary Examiner—Jimmy G. Foster
Attorney, Agent, or Firm—Frank D. Gilliam

[57] ABSTRACT

A decorative piece of personal jewelry, such as, a locket worn around the neck of the user on a chain or a bracelet worn on the wrist of the user. A compartment within the piece of jewelry contains an attached identification and medical history of the wearer. The attached document is constructed of a water proof paper or the like and when the paper extends beyond the edge of the jewelry, the medical history and identification of the wearer is revealed. The document is fan folded within the compartment and concealed from an observer of the jewelry when the jewelry is worn. A symbol recognizable by medical trained personnel is positioned in a prominent location on the outer surface of the jewelry.

16 Claims, 1 Drawing Sheet

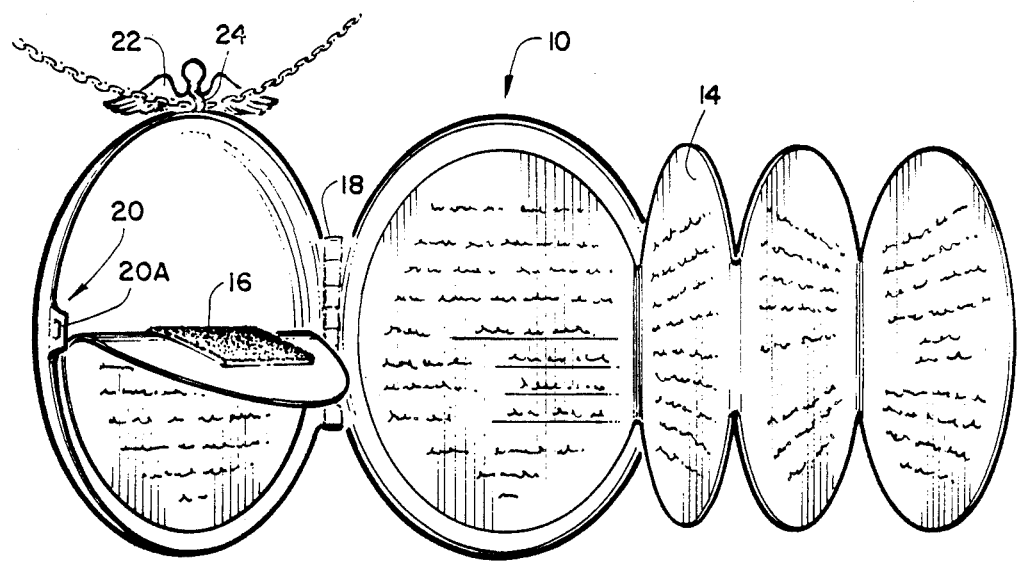
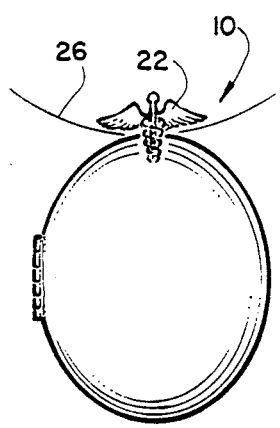 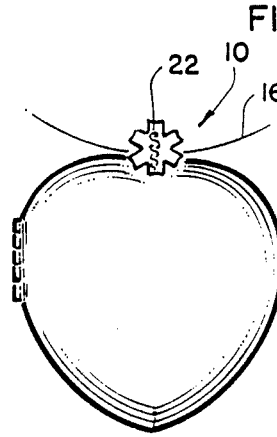 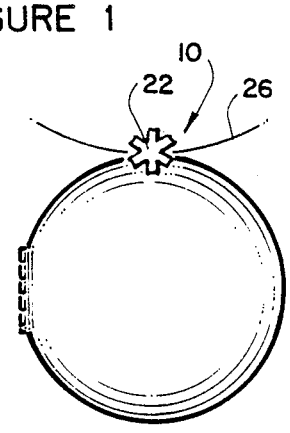 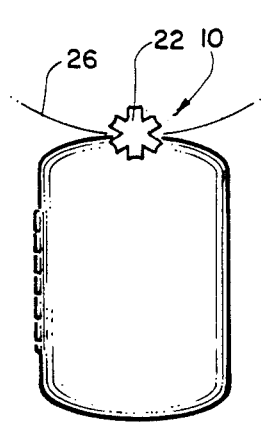
FIGURE 2     FIGURE 3     FIGURE 4     FIGURE 5
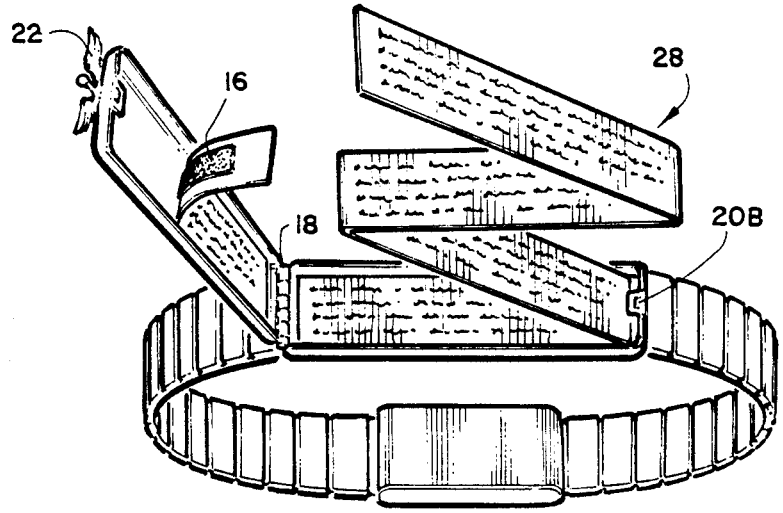 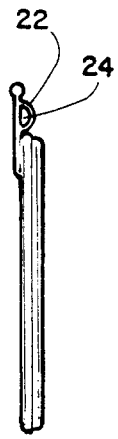
FIGURE 6            FIGURE 7

FINE JEWELRY ENCLOSING WEARER IDENTIFICATION AND MEDICAL INFORMATION THEREIN

BACKGROUND OF THE INVENTION

The invention is directed to fine jewelry and more particularly to identification jewelry which not only contains the identification of the wearer but also the wearer's complete medical history.

ID bracelets and so called "Dog Tags" worn for the purpose of wearer identification and may include a minimal medical history of the wearer are well known.

Modified versions of ID bracelets and Dog Tags can be found in U.S. Pat. No. 4,197,665. This patent teaches an information locket for use by man or animal which has a rotatable center section that when rotated outwardly from the outer walls includes a compartment containing a magnifying glass and an information card with wearer related personal and medical information. The information card with minute writing thereon can be removed and by use of the magnifying glass the writing on the information card can be read.

U.S. Pat. Nos. 3,792,542 and 3,810,566 teach ID cards carried by a person which includes personal and medical information on micro film contained on the device. The teaching of U.S. Pat. No. 3,810,566 also teaches that the micro filmed information can be carried in a ring, bracelet and locket.

U.S. Pat. No. 4,156,539 teaches an identification card and perforated sections for selective removal from the card. The card is filed out by the user and perforated sections not applicable to the user are discarded and the ID portion and applicable perforated sections are attached to the user's clothing or the like.

In these teachings, the fine jewelry appearance of various carriers of the information is non-existing while the carrying of pertinent information is paramount with no regard given to the viewer quality of the object containing the information. Also the use of small items carrying the necessary user information are small and it is hard to apply information thereto and hard for a person to retrieve the information in the time of an emergency. When micro film is used a tremendous quantity of personal information can be contained in a small area; however, recovery is impossible without a micro film reader or the like. At the scene of an emergency micro film readers are not generally available and consequently, the information contained therein cannot be utilized.

There has not been a piece of jewelry recognizable as containing complete vital medical information that is suitable for wearing as fine jewelry on the person, easy to recognize by medical trained personal containing vital information and is readily readable until the emergence of the present invention.

SUMMARY OF THE INVENTION

The invention is directed as a piece of fine jewelry suitable for decorative wearing by a person. The jewelry either takes the form of a locket worn around the neck, as a brooch that can be worn on exterior clothing, a fob that can be worn on any object on the person or as a bracelet worn on the wrist of the wearer. The piece of jewelry includes an emblem denoting a recognizable medical symbol such as a winged caduceus, a modified caduceus, a cross, crosses in modified forms, including a cross with a serpent, etc. positioned in a prominent location on the face of the jewelry, as for example near the locket attachment to a supporting chain or near the locking clasp of a bracelet. The locket and the bracelet have a concealed compartment within which is secured closed by the locking clasp. When the clasp is released, the front and back of the locket or bracelet swing apart about a hinge or the like exposing the hidden compartment. Within the hidden compartment on one side thereof is an attached waterproof paper containing the personal identification of the wearer and on the other side is an attached length of fan folded waterproof paper with a complete medical history of the wearer. The information is either hand written in indelible ink on the paper by the owner or may be inscribed thereon by other methods. Generally, the headings for the required information are printed on the waterproof paper and can be written on with a fine point ball point pen or the like. These areas are not unlike those areas for signatures on credit cards. The waterproof paper can be secured to the inside of the jewelry by the use of two sided tape manufactured by 3M or any other convenient attachment means or method suitable for the purpose intended. The waterproof paper containing the information should not be readily removable from the jewelry once attached thereto.

The clasp for maintaining the jewelry in its wearable viewing condition can take any form suitable for the purpose intended. The jewelry should not readily become open exposing the contents therein, but should be readily openable by manipulation to expose the contents therein as required.

The jewelry can be constructed of precious metals or alloys thereof, base metals plated or coated with precious or semipervious metals or alloys thereof, plastic or other material presentable as a form of fine jewelry.

An object of this invention is to provide a piece of fine jewelry which is identifiable by medical trained personnel as containing identification and/or a medical history of the wearer.

Another object of the invention is to provide a permanent record of the identity and medical history of the wearer of fine jewelry containing such information.

Still another object of this invention is to provide fine jewelry with a medical symbol or a symbol closely related thereto to identify the jewelry as containing the identity and medical history of the user.

Still another object of this invention is to provide a convenient method for the wearer to update their medical record by simply inserting a new fan folded data sheet.

Other objects and features of the invention will become apparent as the drawings which follow are understood by reading the corresponding description thereof.

BRIEF DESCRIPTION OF THE DRAWING FIGURES

FIG. 1 depicts a first embodiment of a fashion jewelry locket of the invention opened exposing the contents thereof which includes identification and medical history of the wearer;

FIG. 2 is a showing of the locket of FIG. 1 in a closed position 1;

FIG. 3 is a second embodiment of the locket of FIG. 1;

FIG. 4 is a third embodiment of the locket of FIG. 1;

FIG. 5 is a fourth embodiment of the locket of FIG. 1;

FIG. 6 is a showing of a bracelet with the concealed compartment open exposing the contents thereof as shown in FIG. 1; and FIG. 7 is a typical side view showing of the lockets of FIGS. 2-5.

DETAILED DESCRIPTION OF THE PREFERRED EMBODIMENTS

Referring now to the various drawing Figures, FIGS. 1 and 2 depict a locket 10 containing an identification sheet 12 and a medical history sheet 14 associated with the wearer of the locket. The identification information is shown located on the inside of the locket on the left side of the drawing FIG. 1 and the medical history located on the right side thereof. It should be understood that the positions of the information may be reversed. The information is contained on waterproof paper such as, KIMDURA a plastic paper commercially available or the like. Any suitable waterproof paper may be used to practice the invention so long as the information written or otherwise placed thereon is not removable or destroyed by water or moisture coming in contact therewith. Heading and associated lines for placing information are generally imprinted thereon at the time of the manufacture of the sheets 12 and 14. The areas above the lines will accept writing thereon as is well known for the placement of signatures on credit cards or the like by a fine ball point pen dispensing indelible ink or the like which is non-removable.

The information sheets 12 and 14 are attached to the inside of the locket by means of adhesive 16 or the like. The adhesive may be two sided tape manufactured by 3m, or any available adhesive suitable for the purpose intended, namely, the information sheets must be non-removable except with a force greater than the force expected to be encountered by normal use.

The locket 10 pivots open to expose the contents in a normal manner about a hinge 18. Clasp means 20, only one side 20A is shown in this drawing Figure, maintains the locket in the normal use or closed configuration as shown in drawing FIGS. 2-5. A medical symbol 22 easily recognizable by trained medical personnel, for example, shown in FIGS. 1 and 2 as a winged caduceus, form a part of the locket and is shown with an attachment loop 24 on the back thereof for attaching a necklace or chain 26 thereto for support. As can be readily seen in the drawing FIGS. 1-5, the medical symbol is positioned at the top most prominent position of the locket to be clearly visible and recognizable by a medically trained observer of the locket and becomes a portion of the design thereof. The medical symbol may be formed from or plated with a different material than the material forming the jewelry so as to stand out from the general appearance of the jewelry if desired.

Drawing FIGS. 3-5 depict different embodiments of the locket of drawing FIG. 1 and the use of different medical symbols thereon and drawing FIG. 7 depicts a typical side view showing of the lockets of drawing FIGS. 2-5. Drawing FIGS. 3-5 show various modified crosses, crosses with a serpent, etc. thereon which generally denote medical symbols. It should be understood that other recognizable medical symbols may be used to practice this invention.

Referring now to drawing FIG. 6 which depicts a second embodiment of the jewelry of the invention. In this embodiment a bracelet 28 is shown. The bracelet like the lockets described above, generally take a normal bracelet appearance which is well known in the art and when the compartment is closed not unlike portion 30 of the bracelet shown in drawing FIG. 5. The FIG. 5 showing, like the showing of FIG. 1, depicts the bracelet in an open position exposing the inner compartment containing the identification sheet 12 and medical history sheet 14 of the wearer. The waterproof sheets 12 and 14 are removably attached to the inner surface of the bracelet as discussed under the description of the locket above.

The clasp 20 having female and male portions 20A and 20B respectively for clasping the bracelet in a closed position is the same or similar to the one partially shown in drawing FIG. 1.

The various embodiments of the invention may be constructed of precious metals or alloys thereof, base metal, either plated or coated with precious metals or alloys thereof, plastic, etc. The jewelry described herein can be constructed of any material which presents the jewelry in a fashionable pleasing or fine jewelry mode.

Although through the discussion the invention herein has been directed to an adult person, it should be understood that the invention can be utilized for children for similar information or the like as well as designed to be attached to an animal collar or the like for ownership information as well as medical history.

While specific embodiments of the fine jewelry containing identification and medical history of the wearer have been shown and fully explained above for the purpose of illustration it should be understood that many alterations, modifications and substitutions may be made to the instant invention disclosure without departing from the spirit and scope of the invention as defined by the appended claims.

What is claimed is:

1. Fashion jewelry enclosing wearer identification and medical information comprising:
    a concealed compartment within said jewelry, said concealed compartment having at least two surfaces located therein;
    a first sheet of waterproof paper with wearer identification thereon attached to one of said two surfaces;
    a second sheet of waterproof paper with wearer medical history thereon attached to the other of said two surfaces; and
    indicia symbolic of the medical profession carried by said jewelry in a prominent external location thereon.

2. The invention as defined in claim wherein said waterproof paper is KIMDURA.

3. The invention as defined in claim 1 wherein said first and second papers are removably attached to said jewelry whereby old information can be removed and new information can be inserted or changes to old information can be accomplished.

4. The invention as defined in claim 1 wherein indica is a winged caduceus.

5. The invention as defined in claim 4 wherein said indica is constructed from a material different from said jewelry and is distinguishable therefrom.

6. The invention as defined in claim 1 wherein said indica is a cross.

7. The invention as defined in claim 1 wherein said indica is a modified cross.

8. The invention as defined in claim 1 wherein said indica is a modified cross with a serpent motif thereon.

9. The invention as defined in claim 1 wherein said second sheet of waterproof paper is fan folded for concealment within said concealed compartment.

10. The invention as defined in claim 1 wherein said jewelry is a locket.

11. The invention as defined in claim 1 wherein said jewelry is a bracelet.

12. The invention as defined in claim 1 wherein said jewelry is manufactured from a precious metal.

13. The invention as defined in claim 1 wherein said jewelry is manufactured from an alloy of precious metal.

14. The invention as defined in claim 1 wherein said jewelry is manufactured from plastic.

15. The invention as defined in claim 1 wherein said jewelry is a broach.

16. The invention as defined in claim 1 wherein said jewelry is a fob.

* * * * *